United States Patent [19]

Guberman et al.

[11] Patent Number: 5,313,527
[45] Date of Patent: May 17, 1994

[54] METHOD AND APPARATUS FOR RECOGNIZING CURSIVE WRITING FROM SEQUENTIAL INPUT INFORMATION

[75] Inventors: Shelja A. Guberman; Ilia Lossev; Alexander V. Pashintsev, all of Moscow, Russian Federation

[73] Assignee: Paragraph International, Sunnyvale, Calif.

[21] Appl. No.: 954,351

[22] Filed: Sep. 24, 1992

Related U.S. Application Data

[63] Continuation-in-part of Ser. No. 712,180, Jun. 7, 1991, abandoned.

[51] Int. Cl.$^5$ .............................................. G06K 9/00
[52] U.S. Cl. ...................................... 382/13; 382/30; 382/40
[58] Field of Search ............... 382/13, 40, 57, 3, 15, 382/14, 30

[56] References Cited

U.S. PATENT DOCUMENTS

| | | | |
|---|---|---|---|
| 3,111,646 | 11/1963 | Harmon | 382/13 |
| 3,127,588 | 3/1964 | Harmon | 382/13 |
| 3,133,266 | 5/1964 | Frishkopf | 382/13 |
| 3,969,698 | 7/1976 | Bollinger et al. | 382/57 |
| 3,996,557 | 12/1976 | Donahey | 382/13 |
| 4,610,025 | 9/1986 | Blum et al. | 382/40 |
| 4,731,857 | 3/1988 | Tappert | 382/13 |
| 4,752,890 | 6/1988 | Natarajan et al. | 382/15 |
| 4,754,489 | 6/1988 | Bokser | 382/40 |
| 4,764,972 | 8/1988 | Yoshida et al. | 382/13 |
| 4,918,740 | 4/1990 | Ross | 382/13 |
| 4,933,977 | 6/1990 | Ohnishi et al. | 382/13 |
| 4,987,603 | 1/1991 | Ohnishi et al. | 382/25 |
| 5,034,989 | 7/1991 | Loh | 382/13 |

OTHER PUBLICATIONS

S. A. Guberman et al., *Avtomatika i Telemekhanika*, "Algorithm for the Recognition of Handwritten Text," (No. 5, May 1976, pp. 122–129, UDC 681.39.06).
Ehrich et al., "Experiments in the Contextual Recognition of Cursive Script," *IEEE Transactions on Computers*, vol. C-24, No. 2, Feb. 1975, pp. 182–194.

*Primary Examiner*—Joseph Mancuso
*Attorney, Agent, or Firm*—Townsend and Townsend Khourie and Crew

[57] ABSTRACT

A method and apparatus for cursive script recognition employs an intermediate cursive words description language constructed of elements in the form of metastrokes wherein each of the metastrokes is a member of a metric space, the metric space being expressible as a matrix of likelihood of matching between input metastrokes and predefined metastrokes forming a vocabulary. Typically, a minimum of twenty metastrokes is used to form the vocabulary or set of allowable stroke elemental shapes, although as many as seventy may be used, with a correlation factor or measurement of similarity being defined between strings of metastrokes. Techniques for interpreting the metastrokes as words include substituting, adding, and deleting metastrokes in an input sequence, measuring similarity and comparing with entries in a dictionary of words constructed of metastroke sequences and variants of metastroke sequences. Weighting of similarity may include penalties for lack of similarity.

20 Claims, 11 Drawing Sheets

| CODE | SYMBOL | DESCRIPTION |
|---|---|---|
| 0 | (NULL) | |
| 1 | I | STROKE W/ WIDE BREAK |
| 2 | ◇ | ANYTHING |
| 3 | — | HORIZONTAL |
| 4 | ∧ | MAXIMUM |
| 5 | ∨ | MINIMUM |
| 6 | < | ANGLE W/O LOOP |
| 7 | = | STROKE W/ SMALL BREAK |
| 8 | • | DOT |
| 9 | + | CROSSOVER |
| 10 | ⌒ | BACKWARD UP ARC, FREE END AT START |
| 11 | ⌒ | BACKWARD UP ARC, FREE END AT END |
| 12 | ⌒ | BACKWARD UP ARC, NO FREE END |
| 13 | ℽ | GAMMA UPSIDE DOWN, CCW |
| 14 | ◯ | CIRCLE, CCW |
| 15 | ℽ | GAMMA, CCW |
| 16 | ⌣ | FORWARD DOWN ARC, NO FREE END |
| 17 | ⌣ | FORWARD DOWN ARC, FREE END AT START |
| 18 | ⌣ | FORWARD DOWN ARC, FREE END AT END |
| 19 | ⌒ | FORWARD UP ARC, FREE END AT END |
| 20 | ⌒ | FORWARD UP ARC, FREE END AT START |
| 21 | ⌒ | FORWARD UP ARC, NO FREE END |
| 22 | ℽ | GAMMA UPSIDE DOWN, CW |
| 23 | ◯ | CIRCLE, CW |
| 24 | ℽ | GAMMA, CW |
| 25 | ⌣ | BACKWARD DOWN ARC, NO FREE END |
| 26 | ⌣ | BACKWARD DOWN ARC, FREE END AT END |
| 27 | ⌣ | BACKWARD DOWN ARC, FREE END AT START |
| 28 | ← | LEFT (ANY ARC) |
| 29 | → | RIGHT (ANY ARC |
| 30 | I | VERTICAL COMPONENT |
| 31 | / | SUBARC AT MAXIMUM LEFT |
| 32 | ⌣ | DOWN ARC (ANY DIRECTION) |
| 33 | \ | SUBARC AT MAXIMUM RIGHT |

*FIG. 3*

FEATURE CORRELATION TABLE

| | — | ∩ | ∧ | ଛ | O | ୪ | V | U | i = |
|---|---|---|---|---|---|---|---|---|---|
| — | 2 | 1 | | | | | | 1 | 1 |
| ∩ | 1 | 2 | 1 | | | | | | 2 |
| ∧ | | 1 | 2 | 1 | | | | | 3 |
| ଛ | | | 2 | 2 | 1 | | | | 4 |
| O | | | | 1 | 2 | 1 | | | 5 |
| ୪ | | | | | 1 | 2 | 2 | | 6 |
| V | | | | | | 1 | 2 | 1 | 7 |
| U | 1 | | | | | | 2 | 2 | 8 | j = 1  2  3  4  5  6  7  8

| — | ∩ | ∧ | ଛ | O | ୪ | V | U |
|---|---|---|---|---|---|---|---|
| −1 | −3 | −2 | −4 | −5 | −4 | −2 | −3 |

FIG. 10a i = 1  2  3  4  5  6  7  8
j = 0

| — | ∩ | ∧ | ଛ | O | ୪ | V | U |
|---|---|---|---|---|---|---|---|
| −1 | −2 | −1 | −3 | −5 | −3 | −1 | −2 |

FIG. 10b

HEIGHT CORRELATION TABLE

|   | 1 | 2 | 3 | 4 | 5 | 6 | 7 |
|---|---|---|---|---|---|---|---|
| 1 | 2 | 2 |   |   |   |   |   |
| 2 | 1 | 2 | 1 |   |   |   |   |
| 3 |   | 1 | 2 | 1 |   |   |   |
| 4 |   |   | 2 | 2 | 1 |   |   |
| 5 |   |   |   | 1 | 2 | 1 |   |
| 6 |   |   |   |   | 1 | 2 | 1 |
| 7 |   |   |   |   |   | 2 | 2 |

| 1 | 2 | 3 | 4 | 5 | 6 | 7 |
|---|---|---|---|---|---|---|
| −3 | −1 | 0 | 0 | 0 | −1 | −3 |

FIG. 12a

| 1 | 2 | 3 | 4 | 5 | 6 | 7 |
|---|---|---|---|---|---|---|
| 2 | 1 | 0 | 0 | 0 | 1 | 2 |

|   | INPUT HEIGHT | | | | | | | | | |
|---|---|---|---|---|---|---|---|---|---|---|
|   |   | 1 | 2 | 3 | 4 | 5 | 6 | 7 | 8 | 9 |
|   | X | -2 | -1 |   |   |   | -1 | -2 |   |   |
| 1 | -2 | 6 | 5 | 2 |   |   |   |   | 6 |   |
| 2 | -1 | 5 | 6 | 5 | 1 |   |   |   | 6 |   |
| 3 |   | 2 | 5 | 6 | 5 | 2 |   |   | 6 |   |
| 4 |   |   | 2 | 5 | 6 | 5 | 2 |   | 4 | 4 |
| 5 |   |   |   | 2 | 5 | 6 | 5 | 2 |   | 6 |
| 6 | -1 |   |   |   | 2 | 5 | 6 | 5 |   | 6 |
| 7 | -2 |   |   | — |   | 3 | 5 | 6 |   | 6 |
| 8 |   |   | 6 | 6 | 6 | 4 |   |   | 6 |   |
| 9 |   |   |   |   | 4 | 6 | 6 | 6 |   | 6 |

METASTROKE HEIGHT CORRELATION MATRIX

METHOD AND APPARATUS FOR RECOGNIZING CURSIVE WRITING FROM SEQUENTIAL INPUT INFORMATION

CROSS-REFERENCE TO RELATED APPLICATION

This is a continuation-in-part of U.S. patent application Ser. No. 07/712,180, filed Jun. 7, 1991, now abandoned.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

This invention relates to cursive script recognition and in particular to cursive handwriting recognition methods and apparatus, that is, recognition of characters and words formed by a continuous stroke, wherein information on stroke order is provided in connection with input of stroke position information.

The field of computer-aided cursive script recognition is of interest since many individuals do not have the skills to communicate through a keyboard and since many tasks would be greatly expedited by the use of direct input to a computer through a familiar writing instrument, such as a pen, pencil or stylus. Cursive handwriting recognition is particularly challenging because the ciphers are formed by continuous strokes and because handwriting differs widely among individuals.

The work of Dr. Shelja A. Guberman of the former Soviet Union, one of the coinventors, forms the basis of the present invention. In a paper published in the Russian language journal *Avtomatika i Telemekhanika*, by Shelya A. Guberman and V. V. Rozentsveig under the title "Algorithm for the Recognition of Handwritten Text," (No. 5, May, 1976, pp. 122-129, UDC 681.39.06) the developers describe the state of the known art of cursive handwriting recognition and propose that the dynamic parameters of pen trajectory be used in connection with the various recognition algorithms. Among the recognition algorithms were feature matching to identify strokes, recognition of the start and finish of a trajectory, and the subdivision of a trajectory into elements, or as termed hereinafter, metastrokes. The developers, however, limited their alphabet of metastrokes to just seven self-intersecting elements and three arc elements. Moreover, the work was silent about the possibility of confusion among elements in the recognition process and did not consider the use of dynamic programming techniques. As a consequence, further development has been warranted in order to improve reliability and utility of recognition.

Elements of a number of techniques similar to those used in connection with the present invention have been disclosed in the past. These references serve to illustrate the state of the art. Details of specific embodiments of the present invention which might use these prior art techniques are therefore not described in depth. The following references are nevertheless of interest in the field of cursive handwriting recognition.

Ehrich and Koehler, "Experiments in the Contextual Recognition of Cursive Script," *IEEE Transactions on Computers*, Vol. C-24, No. 2, Feb. 1975, pp. 182-194. This paper describes the use of segregation techniques between main bodies of letters and ascenders and descenders as part of a prerecognition scheme.

U.S. Pat. No. 3,996,557 to Donahey describes a similar technique to that of Ehrich et al.

U.S. Pat. No. 3,133,266 to Frischkopf describes normalization in the Y direction, use of dictionary matches for recognition and rating of likelihood of accuracy of recognition of individual words.

U.S. Pat. No. 3,969,698 to Bollinger et al. describes an apparatus for post processing of words which have been misrecognized by a character recognition machine, a speech analyzer, or a standard keyboard.

U.S. Pat. No. 4,610,025 to Blum et al. describes the isolation of ascenders and descenders as part of an early analytical step and the isolation of words for identification.

U.S. Pat. No. 4,731,857 to Tappert and U.S. Pat. No. 4,764,972 to Yoshida et al. both describe word isolation as part of the analysis process.

U.S. Pat. Nos. 4,933,977 and 4,987,603 to Ohnishi et al. describes the elimination of extraneous marks in an input pattern, as well as the concept of recognition of elements that are less than complete characters, including straight lines, arcs and loops.

U.S. Pat. Nos. 3,111,646 and 3,127,588 to Harmon describe systems using features extraction recognition techniques as well as stroke sequence information.

U.S. Pat. No. 4,754,489 to Bosker describes a system for recognizing letter groupings called digrams and trigrams.

U.S. Pat. No. 5,034,989 to Loh describes a method for identifying individual handwritten letters.

These prior art references provide a background context for developing an understanding of the present invention. The present invention builds on prior techniques, combines many techniques not heretofore combined, and introduces new techniques heretofore unknown in order to attain an enhanced level of recognition.

SUMMARY OF THE INVENTION

According to the invention, a method and apparatus is provided for cursive script recognition employing an intermediate cursive words descriptive language constructed of metastrokes. Metastrokes are elements or fractions of a stroke shape which are used to represent a stroke. A stroke is defined as the continuous segment which begins when the pen touches the digitizer tablet's surface and ends when the pen is lifted from the surface, comprising one or more written letters. A cursive word may comprise one or more strokes depending upon whether or not the pen is lifted from the surface during the writing of the word. According to the invention, a minimum of twenty metastrokes is typical to form the necessary vocabulary or set of allowable stroke elemental shapes, although as many as seventy metastrokes may be used. Additional metastrokes increase the invention's recognition accuracy at a cost of increased computing time. Techniques for interpreting the input metastroke segments as words include comparing the input metastroke segment with metastroke segments in a dictionary of words "spelled" as metastrokes and assigning a value for the likelihood of a match value to each word so identified. The assigned value for the likelihood of match is referred to as the "word metric." In further detail, this technique involves comparing the input to each word in the dictionary, metastroke by metastroke, assigning a metastroke score to each position where a metastroke match is found, then adding the scores for the matched metastrokes for each segment so tested to obtain the word metric, ranking the words by word metric by comparing the word metrics against a preselected threshold as well as against each other for closeness to one another, then, either simultaneously or consecutively, substituting, adding and deleting metastrokes in the sequence and then comparing the input metastroke segment so modified with the dictionary to obtain further word metrics until a word metric is found which satisfies the threshold criteria. In the dictionary, there are typically many predefined metastroke descriptions ("spellings") for each possible word because of variations in handwriting styles. The process of the invention involves recognition of whole words and not individual letters as has been suggested by others. Instead of seeking to segment a handwritten word into individual letters and seeking the best first letter then the best second letter and so on, the invention uses a process of computing scores of matching The number of possible matches is very large for typical sequences of metastrokes and hence, according to the invention, the process involves adding, deleting and substituting to both decrease the size of the search and to speed the matching process.

In a specific embodiment of the invention, recognition equipment may include a digitizing pad for inputting signals having values representing a sequence of points in a coordinate system with indicia of a beginning point and an end point and processing means for performing various functions on the signals, which may be incorporated in dedicated computer equipment or into data preprocessing means of a computer operating system. The preprocessing means may perform the following processes: segmenting the sequence of points bounded by the beginning point and the ending point into candidate words, strings or segments, differentiating between the ending point of a word segment and that of an individual word, combining word segments to form complete words, establishing a bottom baseline and a top baseline for the candidate word to determine height and scale of the candidate word, reconstructing the candidate word as a reconstructed word with a substitute sequence of points, wherein there are interpolated points inserted and spurious points deleted, locating and tabulating, in sequential order, critical points in the reconstructed word, including maxima, minima, intersections, dots and crossovers, replacing the reconstructed word with a sequence of metastrokes according to the vocabulary of metastrokes according to the invention, wherein each metastroke is representative an element of a handwritten cipher. In particular, this replacing step may comprise comparing the critical points against indicia of known critical points to obtain a preliminary metastroke sequence for each said reconstructed word. Thereafter, the technique contemplates selecting, by means of a matrix of likelihood of matching between each of said metastrokes, from entries in a dictionary of entries compiled from variants of known sequences of said metastrokes, many of the most likely matches in likelihood order. This selecting step may comprise choosing the preferred metastroke at selected positions according to a maximum score calculation. There may be an analysis performed on i) a forward sequence of the metastrokes, on ii) a reverse sequence of the metastrokes, and on iii) most likely beginnings of words and simultaneously on most likely endings of words. The maximum score calculation may comprise an analysis of the weighting of the results of additions, deletions, and substitutions of metastrokes relative to adjacent metastrokes. The results are provided to an output device in the form of preferably only one, but possibly several, candidate words based on a listing of most likely matches from the dictionary. There is typically an indication of positive recognition of a single candidate word if the likelihood of match figure of merit exceeds a preselected threshold value.

In a further detail of a specific embodiment, the methods may include measuring the average slant of sequences of points of each candidate word segment and then dividing the candidate word segment along horizontal boundaries into a middle zone between the lower baseline and the upper baseline, where bodies of letters are predicted to reside, into an upper zone wherein ascenders of letters are predicted to reside, and into a lower zone wherein descenders of letters are predicted to reside. This height information, along with the shape information provided by the identification of metastrokes, assists the dictionary in determining the merit of any metastroke at a position in a sequence of acceptable metastrokes in its dictionary. The height information is also weighted as part of the correlation.

The invention will be better understood, and greater details on aspects of the invention will be apparent upon reference to the following detailed description taken in conjunction with the accompanying drawings.

BRIEF DESCRIPTION OF THE DRAWINGS

FIG. 3 is a table illustrating the metastrokes in accordance with the preferred embodiment of the present invention.

FIG. 9 is an illustration of a sample metastroke feature correlation table of data for substitutions used to force an input sequence to look like a vocabulary sequence.

FIG. 10A illustrates sample penalties for the addition of selected metastrokes used to force an input sequence to look like a vocabulary sequence.

FIG. 10B illustrates sample penalties for the deletion of selected metastrokes used to force an input sequence to look like a vocabulary sequence.

FIG. 11 is an illustration of a height correlation table corresponding to the table of FIG. 9 used in substitutions to force an input sequence to look like a vocabulary sequence.

FIG. 12A indicates sample height penalties corresponding to the table of FIG. 10A used in additions to force an input sequence to look like a vocabulary sequence.

FIG. 12B indicates sample height penalties corresponding to the table of FIG. 10B used in deletions to force an input sequence to look like a vocabulary sequence.

FIG. 13 is a complete metastroke feature correlation table of data for weights for substitutions used to force an input sequence to look like a vocabulary sequence, for penalties for additions (column 1), and for penalties for deletions (row 1) defining the similarity measure for metastrokes for one embodiment of the invention.

FIG. 14 is a complete height correlation table for the embodiment corresponding to the feature correlation table of FIG. 13 illustrating the weights and penalties for substitution, additions (column 1) and deletions (row 1) used to force an input sequence to look like a vocabulary sequence.

DETAILED DESCRIPTION OF SPECIFIC EMBODIMENTS

Figure 1:
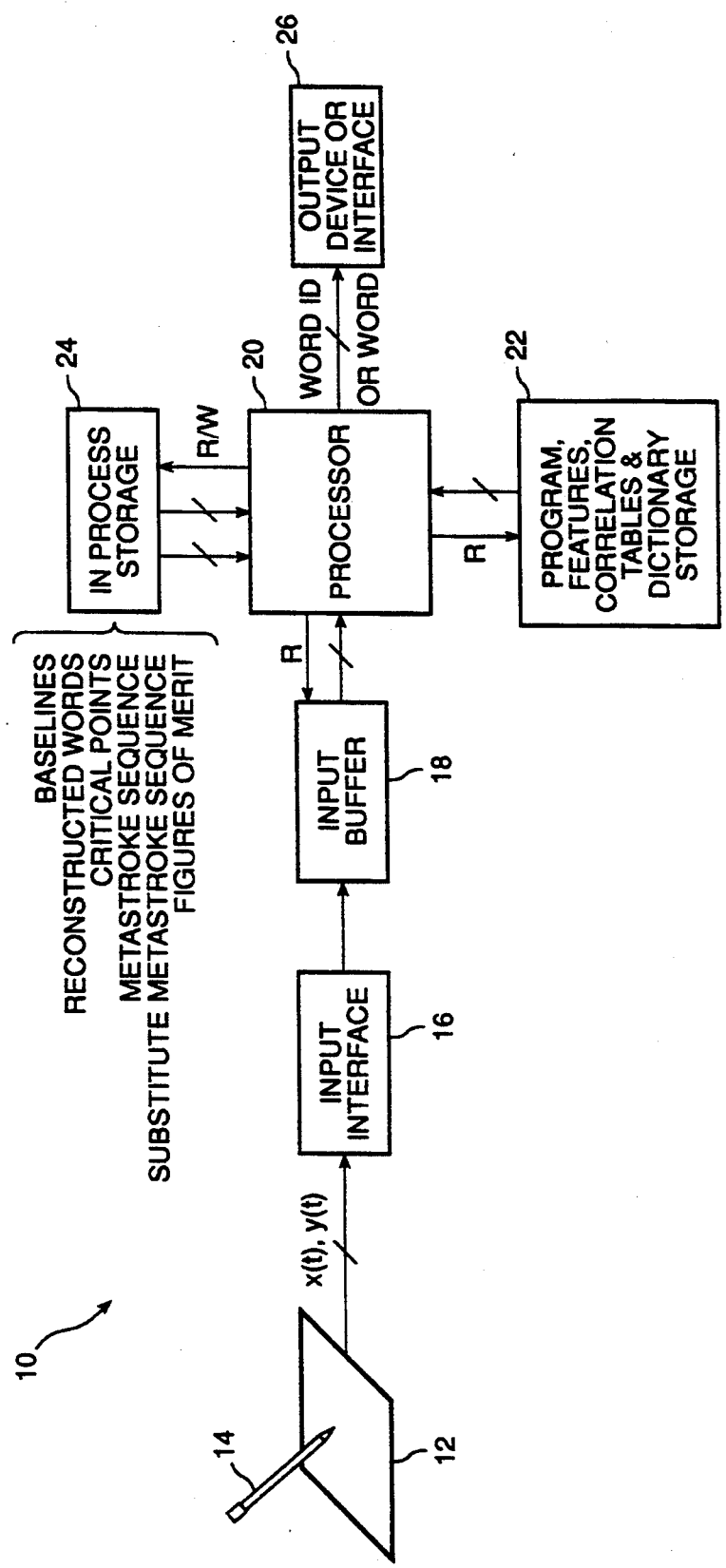
FIG. 1 is a block diagram of a general recognition system according to the invention.

Referring to FIG. 1, there is shown a recognition apparatus 10 for cursive handwriting in accordance with the invention. The apparatus 10 comprises first of all as its input device a digitizer pad 12 or equivalent mechanism, which produces as output in response to input from a stylus 14, "input" signals having values representative of a sequence of points symbolizing handwriting in a coordinate system defined by the digitizer together with a symbol or indication of the beginning point and ending point of each sequence of points. The signal for the beginning point and the ending point may be simply a negative value generated automatically whenever the stylus 14 is lifted from the digitizer 12. The x-y coordinate sequence of points is fed to an input interface 16, which in turn provides the values of these coordinate points to an input buffer means 18. Input buffer means 18 provides for temporary or off-line storage while the input sequence is processed. The apparatus 10 further comprises a processor 20 with associated program storage means 22, such as read only memory (ROM), and in-process storage means 24, such as random access memory (RAM). Control and data lines are provided between the processor 20 and the in-process storage means 24 and the program storage means 22. The program storage means 22 is for storing, permanently or semipermanently, executable computer programs, a features table for identifying metastrokes as hereinafter explained, correlation matrixes or tables related to the metastrokes, and dictionaries of metastrokes for identifying words or the like.

The in-process storage means 24 is for the temporary storage of candidate words derived from the input data, baselines computed from the words, reconstructed words based on interpretation and normalization, as well as other related processes, critical points of the reconstructed words for comparison with the features, metastroke sequences derived from the features tables, substitute metastroke sequences generated as the result of maximum score calculations and figures of merit for various maximum score calculations developed from use of the correlation tables. The processor 20 executes the programs of the program memory means 22 to eventually generate a word identification or a word to be supplied to an output device or output interface 26.

Figure 2:
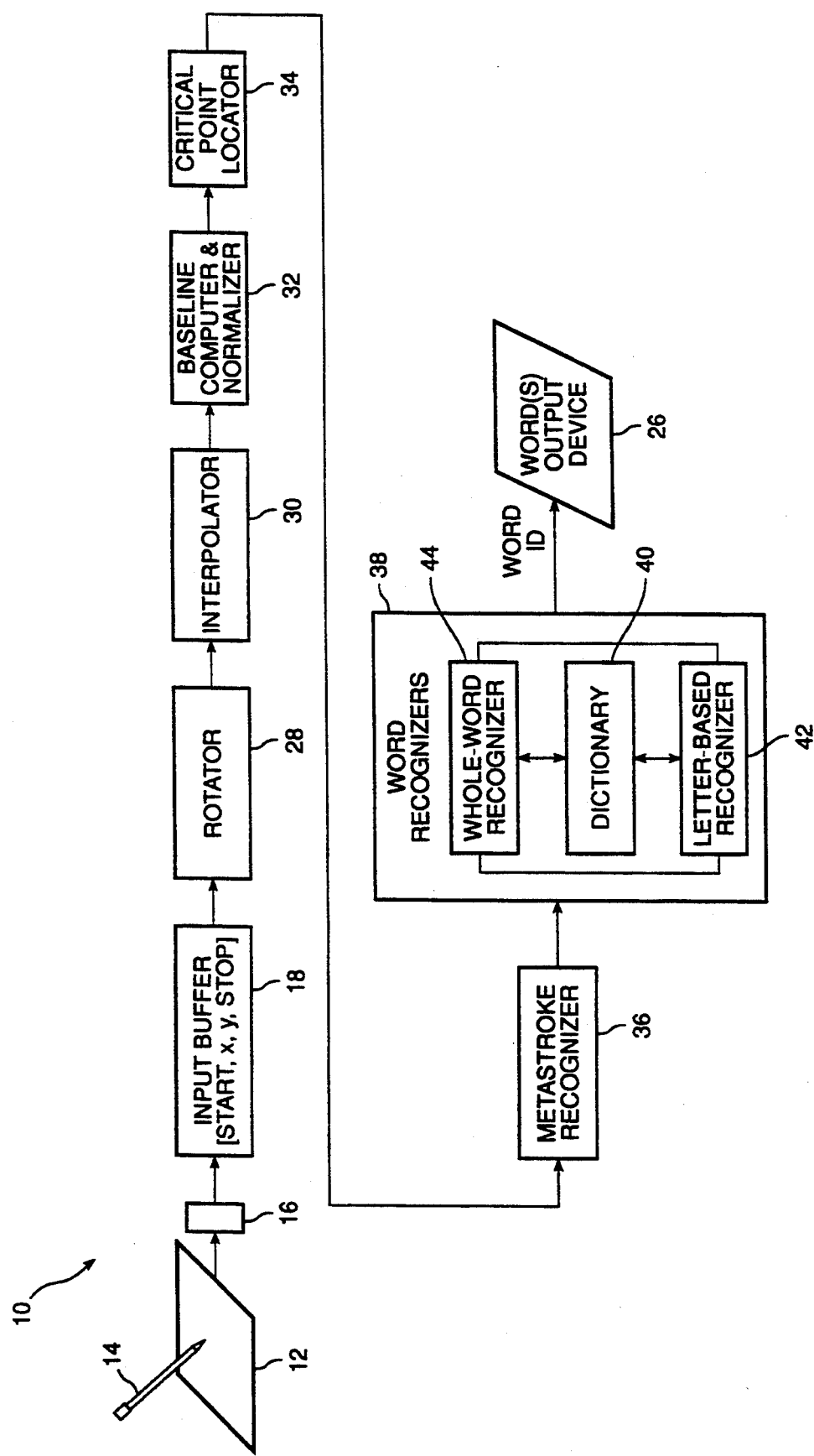
FIG. 2 is a block diagram of functional elements of the invention.

Referring to FIG. 2, there is shown in greater detail the functional elements of an apparatus 10 in accordance with the invention. The digitizer 12, through the input interface 16, provides the start mark, the stop mark and the position data to buffer means 18. The input buffer means 18 may identify the boundaries of a candidate word by means of the start mark and the stop mark, indicative of a break in the input sequence of data. The input buffer means 18 may also identify the boundaries of a candidate word segment by comparing the length of different data sequence breaks; determining which breaks are indicative of a word break and which breaks are indicative of a break within a word. Means 28 are provided for establishing orientation and specifically for determining the direction of writing to in such a way that the direction of writing becomes parallel to a horizontal reference.

Means 30 are thereafter provided for reconstructing the candidate word (as a "reconstructed word") with a substitute sequence of points. The substitute sequence of points may have points inserted in the candidate word at interpolated locations and spurious points deleted from the candidate word. Spurious points are those points which seem to have no relation to any sequence of strokes, either as a continuation of a segment or as a point, such as a period or an accent mark.

Thereafter, means 32 are provided for establishing a bottom baseline and a top baseline for each candidate word to determine height and scale. More specifically, the baseline establishing means 32 incorporates therein means for dividing the candidate word horizontally into a middle zone between a lower baseline and an upper baseline calculated by examining, for example, the density of points above and below each baseline, and designates the space above the baseline as ascenders of letters and designates the zone below the baseline as descenders of letters. The element 32 also includes means for measuring average slant of the selected sequences of points, for example, as determined by average trajectory of each of the selected ascenders and descenders in the ascender zone and the descender zone, respectively. Means 32 also includes means for normalizing the data to a desired scale.

The means 32 then conveys its data to a critical point locator 34. The purpose of the critical point locator 34 is to locate and tabulate in sequential order all relevant critical points in the reconstructed word segment produced by the point interpolator 32. Examples of critical points are maxima, minima, intersections of line segments, dots and crossovers. The critical points thus tabulated can then be compared with a table containing known critical points identifying metastrokes.

According to the invention, metastroke recognizer 36 is provided which processes the features evidenced as critical points and substitutes for the reconstructed word segment a string of metastroke identification codes. A minimum of twenty metastrokes is typical to form the necessary vocabulary or set of allowable stroke elemental shapes, although as many as seventy metastrokes may be used. Additional metastrokes increase the invention's recognition accuracy. In the preferred embodiment there are thirty-three different defined metastrokes or cursive writing features.

Referring to FIG. 3, there is shown a table of metastrokes with the definitions thereof for the preferred embodiment. These metastrokes have been determined, according to the invention, to provide for identification of English-language words in a computer-stored dictionary.

The metastrokes identified in the table of FIG. 3 are as follows:

- a stroke with a wide break,
- a "wild card" stroke which could be anything,
- a generalized horizontal stroke,
- a feature maximum,
- a feature minimum,
- an angle without a loop,
- a stroke with a small break,
- a dot representing a period or the like,
- a crossover,
- a backward up arc with a free end at the beginning of the arc,
- a backward up arc with a free end at the termination of the arc,
- a backward up arc with no free end,
- an upside down gamma drawn with counter-clockwise strokes,
- a circle drawn with counter clockwise strokes,
- a gamma drawn with a counter clockwise stroke, a forward down arc without a free end,
- a forward down end with a free end at he start,
- a forward down arc with a free end at its termination,
- a forward up arc with a free end at its termination,
- a forward up arc with a free end at its start,
- a forward up arc without a free end,
- an upside down gamma drawn clockwise,
- a circle drawn clockwise,
- a gamma drawn clockwise,
- a backward down arc without a free end,
- a backward down arc with a free end at its termination,
- a backward down arc with its free end at the start,
- a left directed or horizontal of any arc,
- a right directed or horizontal of any arc,
- a generalized vertical component,
- a generalized subarc at the maximum left end of a segment, and
- a down arc of any direction and a subarc at the maximum right end of any word segment.

Referring to FIG. 2, the metastroke code string (hereinafter the metastroke string) generated by the metastroke recognizer 36 is provided to a word recognition subsystem 38 according to the invention for recognizing words in a specific language, such as English. The processing function of one element thereof will be explained in greater detail hereinafter. Elements of the word recognition subsystem 38 include a "whole-word"-based analyzer means 44 for performing maximum score analysis by dynamic programming procedures as hereinafter explained to attain optimal matching between a string of input metastrokes and a "vocabulary" metastroke string forming a known whole word. Subsytem 38 may optionally also include a "letter"-based analyzer means 42 for analyzing metastrokes by letter (alphanumeric character). Some of these types of "letter"-based analyzer means 42 are known in connection with character-based or segmented string recognition. Such analysis is not to be confused with whole-word-based analysis techniques which are hereinafter explained.

The letter-based analyzer means 42 may work in combination with or complement the whole-word analyzer means 44. The word recognition means 38 may include for example a stored dictionary 40 of whole words comprising metastrokes in direct order and in reverse order. The letter-based analyzer means 42 may use some of the same dictionary entries as the whole-word analyzer means 44 in procedures operating independently and in parallel to the whole-word analyzer means, in an attempt to recognize characters as strings of letters forming meaningful words.

The output of the word recognizer 38, which may be some form of best selection chosen from a variety of analysis procedures, is provided to a word output device 26 as previously noted.

Figure 4:
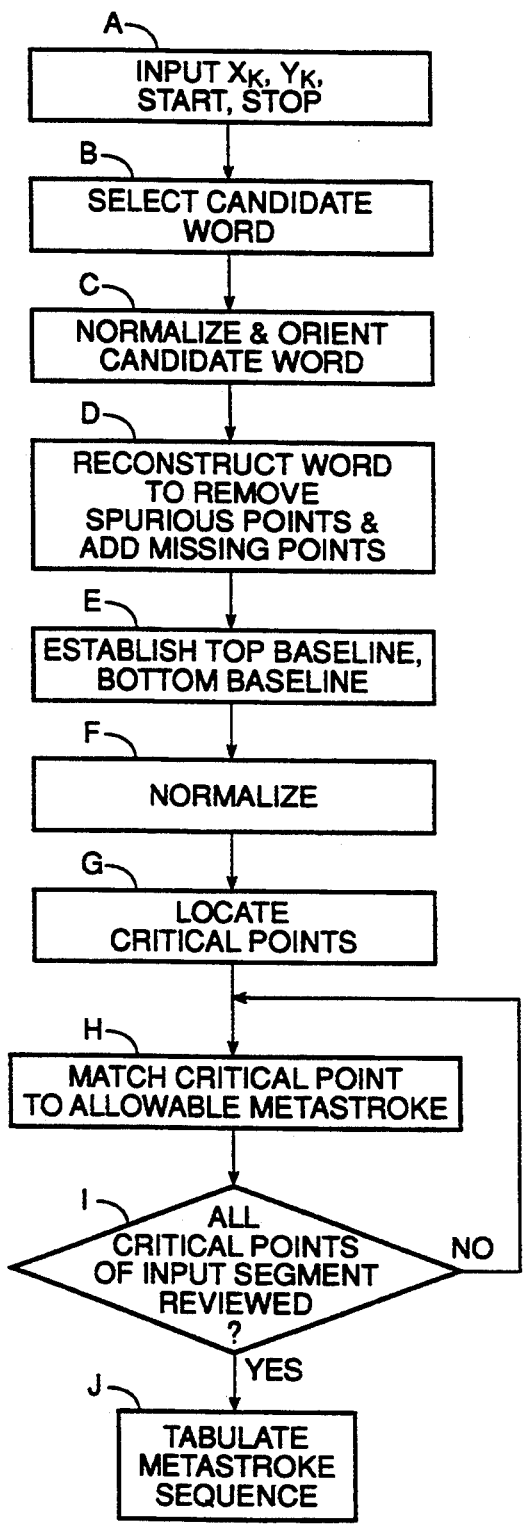
FIG. 4 is a first flow chart of a method according to the invention.

Referring to FIG. 4, there is shown a flow chart of processes in accordance with the invention from input to output of metastroke recognizer means 36. According to the invention, the input sequence is provided as a string of x and y coordinate values for points, along with a start and stop indicator (step A), then a bounded string is selected as a candidate whole word from the input string received from the input device (step B); thereafter direction of writing is established and the candidate word is "rotated" (oriented in its frame of reference) to make the orientation of the writing parallel to a horizontal reference (step C). The candidate word is then reconstructed as a reconstructed word to remove spurious points and add missing points (step D). Thereafter, a top baseline and a bottom baseline are established (step E), and the candidate word is normalized (step F).

Thereafter, critical points are located in the sequence of points (step G). Critical points, such as maxima, minima and intersections, as well as the order of critical points, are useful for identifying metastrokes and the order of metastrokes. Critical points are then matched against allowable vocabulary metastrokes to identify the string of input metastrokes used to "spell" a candidate word (step H). Step H is repeated for each critical point of the input word until all of the critical points have been matched against metastrokes (step I). The result is the string of input metastrokes used to "spell" the candidate word. The metastroke string is then tabulated for further processing (step J).

Figure 5:
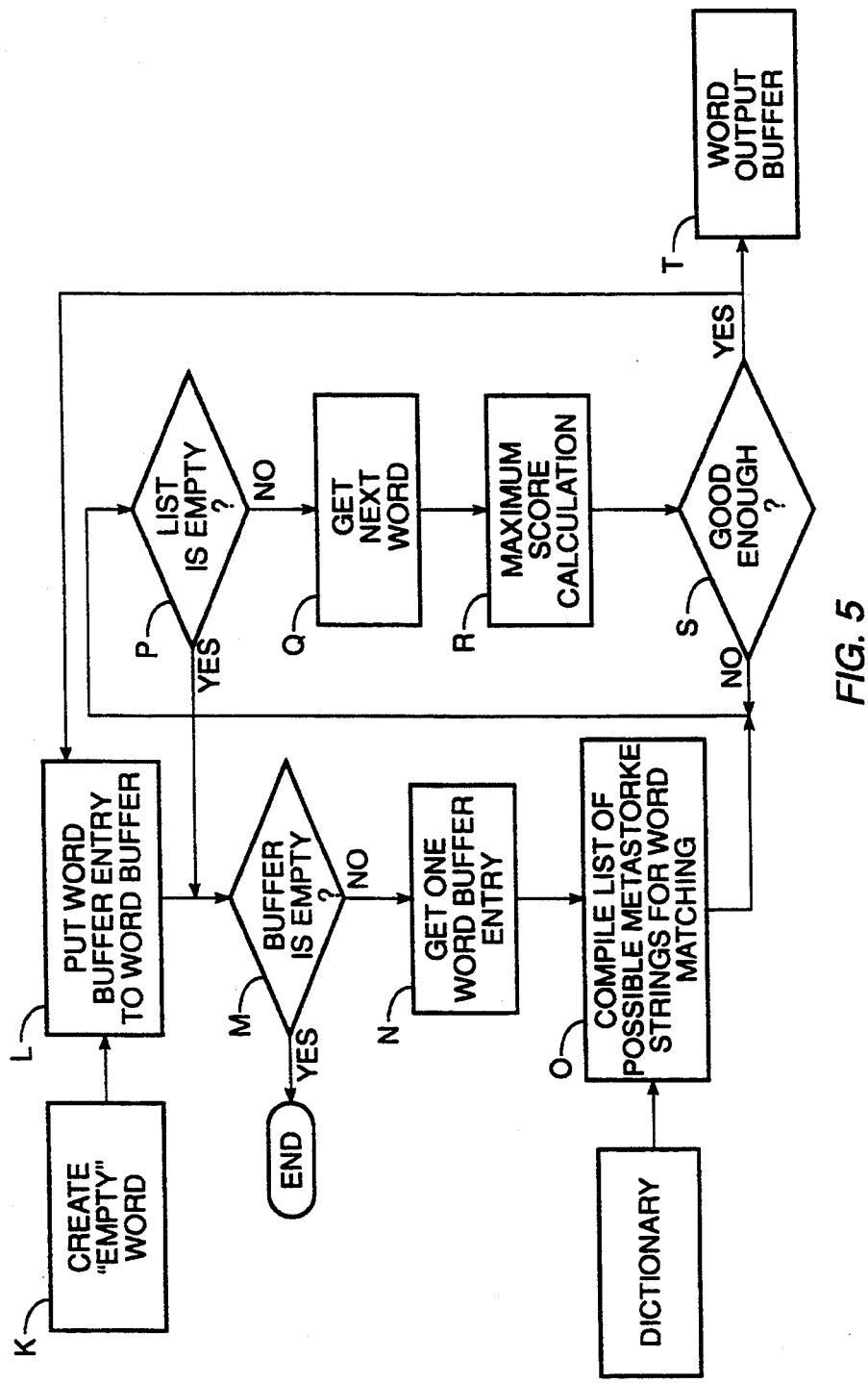
FIG. 5 is a second flow chart of a method according to the invention.

A flow chart for a portion of the whole-word-based analyzer system 44 according to the invention is shown in FIG. 5. In this process, words in the dictionary are excluded so they need not be analyzed further. The process first tests using the direct vocabulary (the forward direction) and then the reverse vocabulary (in the reverse direction). First, an "empty" word is created (step K) and placed in a buffer (step L). An "empty" word is a "null" set, that is, a word having all of the characteristics that words should have but having no meaningful value. It is a place-holder, much as zero is a place-holder in an initialized storage register.

The content of the word buffer is then tested to see if the word buffer is empty (step M). If the word buffer is not empty, then the next entry (the string representing the candidate word) is retrieved from the word buffer for analysis against the dictionary(step N). This will occur whenever an input string from the input device is placed in the word buffer. Using the dictionary of whole words as a source, a list is then compiled of all ("n") possible words which are candidates to match the latest entry retrieved from word buffer (step O). The compiled list is thereafter tested to be sure it is not empty (step P). (The list could be empty at the outset if the critical point test, above, has been performed and no matches were found. The list will also be empty at the end of a whole-word analysis when the list has been exhausted.) After testing to determine that this list is not empty, the "next" vocabulary word in the list is retrieved for use in analysis against the retrieved entry, namely, against the input candidate word retrieved from the word buffer (step Q). The retrieved vocabulary word is compared as a whole word to the retrieved input entry according to the invention by dynamic programming techniques as hereinafter explained, from which an "optimal cost value" or maximum score is derived to determine the degree of match between the input candidate word and the vocabulary word (step R). Steps P through R are repeated until the list is exhausted (Step P) or until the maximum score meets certain criteria for acceptability (step S). If the list is emptied, a "no match" signal is generated, and the process is continued by looking for the next word in the input word buffer. If the acceptance criteria are satisfied by whatever acceptance criteria are then applicable, the word is communicated to a word output buffer (step T) for further use, such as display or processing. The process then continues to the next input metastroke sequence in the entry buffer (steps K and L).

The step of optimal match calculation employs two inputs: the input sequence of metastrokes forming a string for a word and the pattern or sequence of "vocabulary" metastrokes from the dictionary representing a known word. Each vocabulary sequence of metastrokes describes one of the accepted ways of rendering a word. Data for analyzing the optimal match is extracted from a feature correlation table and a height correlation table, as hereinafter explained.

A simplified example of the recognition procedure for whole words follows for illustration purposes only. If the word "run" was handwritten on a digitizer tablet, the first step would be to construct an input metastroke string, or sequence of preselected stroke-like ciphers based on accepted stroke forms obtained from an analysis of cursive handwriting. The input metastroke string is a series of metastrokes, rather than points or letters. The vocabulary of metastrokes for that string is limited to an established number of choices, such as 20, 30, 40 or 50 different stroke shapes. FIG. 3 above is an example of one functional embodiment. The input string can be represented compactly in a computer by a string of symbols, for example the string of arbitrary symbols or their ASCII equivalents: {-]v_v--\/v^v . The sequence forming the input metastroke string is then placed in the word buffer in its symbolic form and, according to the whole word analysis procedure of the invention, compared as a whole segment with all relevant entries in a "dictionary" of whole words, spelled out as metastrokes using as its vocabulary the same symbolic forms used to form the input metastroke string. A sample dictionary may for example comprise the entries:

| Vocabulary Segments | | |
|---|---|---|
| Metastrokes | | Word |
| ∩]v_v--\/\^ | = | run |
| ∩]v_~--(/v^ | = | run |
| {-]v_~--\^\^ | = | run |
| {-]v_)--◊-) | = | run |
| ∩v_)---∧]] | = | ran |
| {-]v_--~-_-^ | = | ran |
| {-]v_--- ~-) | = | ran |

(This is a very simple, two-word, seven-string dictionary.)

While comparing can be done by testing for a match between the input metastroke string and each metastroke-spelled word in the dictionary, metastroke by metastroke, noting by a score or a value each position where a match between input metastrokes and vocabulary metastrokes is found, and then adding the scores of the matched metastrokes for each input metastroke segment so tested to obtain a "word " metric (i.e., matching score) for each entry, that process is not what is undertaken in the word analyzer means 44 in accordance with the preferred embodiment of the invention. However, for illustration purposes, such a matching scheme is described so that the more complex example hereinafter given will be understood more easily.

In the table above, the simplified comparison process would produce results as follows, assuming that the maximum score calculation allowed simple summation of the weights and a maximum score for a single metastroke match is 6:

| Vocabulary Metastrokes | Word | Input metastroke segment | Match | "Word" Metric |
|---|---|---|---|---|
| * ∩]v_v--τ/\^ | = run | {-]v_v--\/v^v | 6-66666666-6- | 60 |
| ∩]v_~--(/v^ | = run | {-]v_v--\/v^v | 6-666-66-666- | 54 |
| {-]v_~--\^\^ | = run | {-]v_v--\/v^v | 66666-666--6- | 54 |
| {-]v_)--◊-) | = run | {-]v_v--\/v^v | 6-666-66---- | 36 |
| ∩v_)---∧]] | = run | {-]v_v--\/v^v | 6-666-66-6--- | 42 |
| * {-]v_--~-_-^ | = ran | {-]v_v--\/v^v | 66666-66---6- | 48 |
| {-]v_--- ~-) | = ran | {-]v_v--\/v^v | 6-666-66---- | 36 |

The dash "-" appears wherever there is no match with the metastroke at that position. The metastroke-spelled words are typically grouped together by English-language definition, so the "hit" is manifest (listed) as the English-language word with a score which is the highest score of any of the metastroke-spelled words in that grouping. This is indicated by the asterisk "*" in the left margin, above.

The English-language words which are hits are ranked by their highest word metric, this metric being first normalized. Above, it would be:

| Word | "Word" Metric | Normalized Metric |
|---|---|---|
| run | 60 | 0.77 |
| ran | 48 | 0.62 |

The normalized word metrics in this simplified example can then be compared against a preselected threshold to determine acceptability, as well as against each other for closeness to one another to determine "confusibility." If the word is determined to be acceptable, then the word is sent to a word output buffer. If the word metric does not surpass the threshold, then the input metastroke segment is changed by substituting, adding and deleting metastrokes from the list of candidate English-language words.

In the above example, if a normalized metric of 0.77 did not surpass the threshold, various metastrokes might be added, deleted or substituted in the input metastroke string to try to obtain a better match with a known string in the dictionary and a further comparison to the dictionary word would be made. Additions and deletions are assigned negative weights, whereas substitutions are assigned positive weights depending upon the "direction" and position of the substitution. If the last metastroke of the input segment was deleted, the normalized metric of the first "definition" of "run"

would increase from 0.77 to 0.83, possibly meeting a preselected threshold.

FIGS. 6-12 show a second, more accurate example of the whole word recognition process according to the invention more exactly illustrating how the dynamic programming process of the present invention is carried out to attain recognition of a whole word. FIG. 6A shows the handwritten word "may." In one embodiment of the invention this word can be expressed as the sequence of metastrokes shown in FIG. 8B. The numbers next to particular features of the word indicate the corresponding metastrokes (see the horizontal axis of FIG. 6B).

As indicated hereinabove, the dictionary can have numerous metastroke "spellings" for an individual word, due to the variations in possible writing style. In this example it will be assumed that there is only one spelling of "may" in the dictionary, as shown in FIG. 7. Comparing the metastroke sequence of FIG. 6B with that of FIG. 7 shows that the match is not exact. (Note the letter "a".) Due to the many variations in writing style, this is commonly the case.

To determine if the dictionary spelling of "may" is considered a match with the input sequence, a word correlation table is constructed comparing, as a whole, the input metastroke string with each vocabulary metastroke string which is a candidate for a match. As a consequence of the inventive process, and a word metric (i.e., a value defined by the likelihood of a match existing) and an optimal "path" through the sequence of metastrokes results, but only after the processing of the whole input metastroke string is completed. The larger the word metric, the closer the match.

Figure 6A:
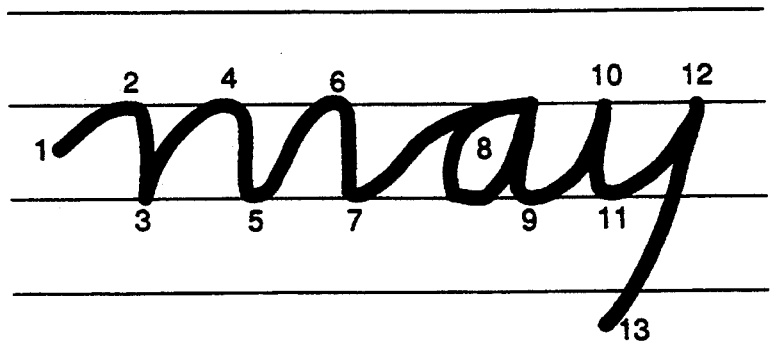
FIG. 6A is an illustration of the handwritten word "may."
Figure 6B:
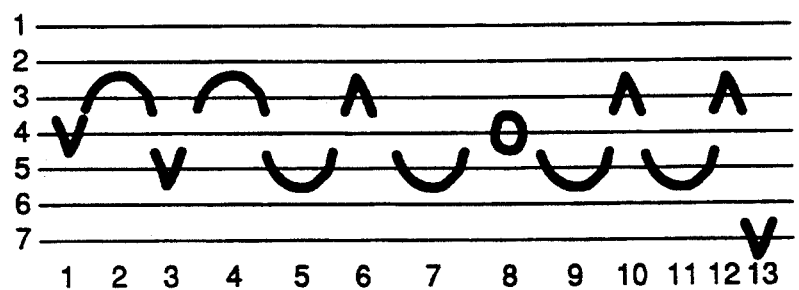
FIG. 6B is a possible metastroke sequence based on the word "may" in FIG. 6A.
Figures 7, 8:
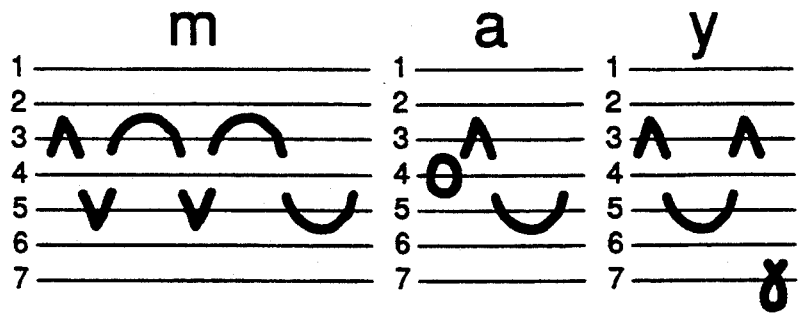
FIG. 7 is a possible dictionary spelling of the work "may."
FIG. 8 is a possible correlation matrix for the word "may."

FIG. 10 is an example of a resultant word correlation table for the word "may" wherein the input metastroke string of FIG. 6B is matched against the vocabulary metastroke string of FIG. 7. The values in each cell is derived from computations of added value based on transitions between a preceding diagonal position, a preceding row position and a preceding column position, wherein the highest valued transition of these three choices is selected and then the cell is assigned the sum of the weigh of the transition and the value of the preceding cell. This is a process of dynamic programming. The source of weights is obtained by reference to a feature correlation table and a height correlation table, the values of which are based on the size and nature of the vocabulary of metastrokes and an analysis of allowed and disallowed substitutions, insertions and deletions between all metastrokes in the vocabulary.

By way of example, there is a feature correlation table, FIG. 9, which indicates the likelihood of a match existing between individual metastrokes in a vocabulary of a mere eight metastrokes. Each column entry represents a metastroke found in the input string; each row entry represents a metastroke found in the dictionary built from this (limited) vocabulary of metastrokes. The highest value or metric is assigned to a substitution of a vocabulary metastroke for an identical input metastroke, i.e., along the diagonal. Lower metrics are assigned to substitution of vocabulary metastrokes for input metastrokes which are close in shape. Disallowed substitutions are shown as blanks in the table, and a large negative value is assigned to those positions in the table: (−1000), so that computations based on those substitutions always produce a result which is outside the range of consideration for an overall match.

Input metastroke additions and deletions are allowed by the invention although there is a penalty associated with each. FIG. 10A shows sample penalties for the addition of selected metastrokes while FIG. 10B shows sample penalties for the deletion of selected metastrokes. Besides looking at the correlation between metastrokes (positive values) and the penalties associated with adding or deleting metastrokes (negative or penalty values), a height comparison (relative to a word's baseline) is also made. FIG. 11 is a height correlation table while FIGS. 12A-B indicate height penalties associated with the tables of FIGS. 10A-B, relating respectively to additions and deletions.

Figure 13:
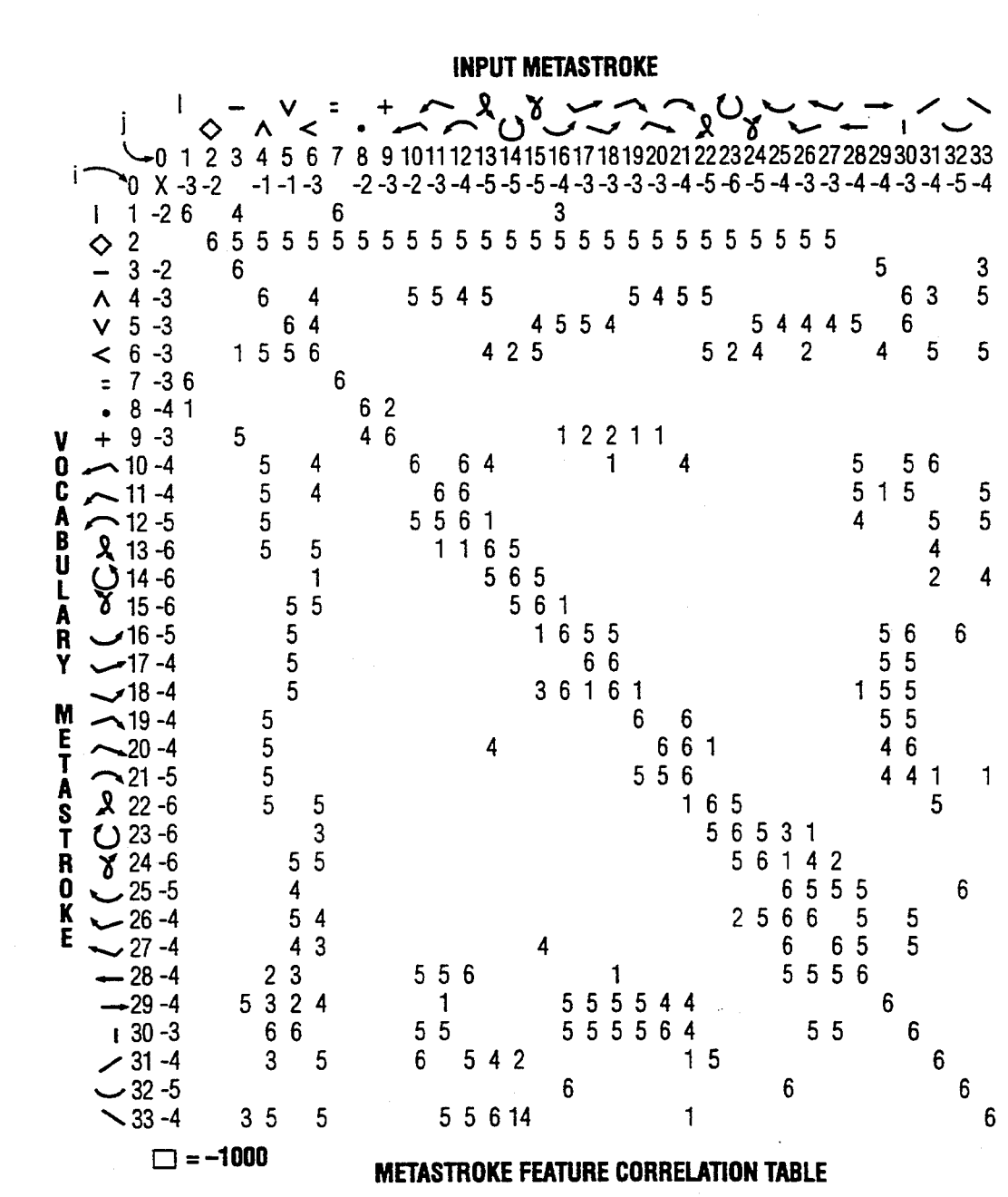

The word correlation table of FIG. 8 for each vocabulary word can be derived from data from the tables of FIGS. 9, 10A, 10B, 11, 12A and 12B, which is a simplified example, or from data of FIGS. 13 or 14, which is from an actual working system. (In FIGS. 13 and 14, the addition vectors corresponding respectively to FIGS. 10A and 12A are shown as the top row of the tables, and the deletion vectors corresponding respectively to FIGS. 10B and 12B are shown as the left-most column of the tables.) The word correlation table of FIG. 8 is computed based upon a dynamic programming technique for computing "optimal cost" as it is called in the art and "path" for a transformation of one sequence into another. In this invention the transformation or mapping is made upon an entire input sequence to force it into the length and form of any one of a number of known vocabulary metastroke strings. It is therefore necessary to execute the transformation upon the entire sequence before conclusions can be reached about the results.

FIG. 13 is a data table for showing the transformations of input metastrokes into vocabulary metastrokes. The left margin lists the vocabulary metastrokes, i.e., the metastrokes found in the vocabulary. The top margin may be labeled with the same metastrokes in the same order. The diagonal of the table is the value assigned to a direct transformation of an input metastroke to the identical metastroke in the vocabulary. Off-diagonal values represent values assigned for substitution of other vocabulary metastrokes for the input metastroke in a process of building a metastroke string which matches a metastroke string found in the dictionary. FIG. 14 is a height correlation table for nine levels of height. Penalties are assigned for deletions and additions, as illustrated along the zeroeth row and the zeroeth column, respectively, of FIG. 13 and as shown separately in the example using FIG. 10A (corresponding to column 0 of FIG. 13) and FIG. 10B (corresponding to row 0 of FIG. 13.) In a deletion, a metastroke is deleted from the input string. A deletion is indicated by a negative value of preselected magnitude (Row Zero, any column). Similarly for addition, a metastroke is added to a position in the input metastroke string, and the action is indicated by a negative value of a preselected magnitude (Column Zero, any row). A "substitution" (where a vocabulary metastroke is substituted for an input metastroke) is indicated by a positive value, as indicated by the position in the matrix. The special case of "substitution" of a metastroke for itself is the diagonal, and is therefore assigned the highest value. There is absolutely no requirement that the feature correlation table be symmetric, as substitution is not a symmetric process.

The technique for interpreting the input metastroke string as a word is straightforward but involves substantial processing. In the dynamic programming approach, comparison, weighting and modification processes are carried out simultaneously. The process is analogous to "wiggling" a "worm" to see if it can be made to line up with the shape of some sample "worms." Additions, deletions and substitutions cause the worm to wiggle. Each action results in a weighting or a penalty.

The steps of the dynamic programming technique include a process of comparing an entire input metastroke string with all relevant metastroke strings in a dictionary of words "spelled" as metastrokes to build a path for the transformation of the input string into one of the dictionary metastroke strings and determining the one maximum value or so-called "optimal cost" for processing the entire input metastroke string against each vocabulary metastroke string. In theory, the entire input metastroke string could be processed against all strings in the dictionary. However, certain streamlining steps are typically taken to speed up the processing. (To streamline the processing, not all dictionary entries need to be examined, although the techniques to so limit the processing are not part of this aspect of the invention. Such optimization techniques may take advantage of features of the dictionary. The dictionary may for example be arranged by number of strokes, or be "alphabetized" by metastroke. Analysis may be performed on a forward sequence of metastrokes, on a reverse sequence of metastrokes, on most likely beginnings of words and on most likely endings of words.) As previously described, included in the dictionary is a "definition", an English-language (or any other language) word, spelled out in Roman characters, i.e., the ASCII strings corresponding to Roman characters, which is the single word to be recognized. Thus there may be several dictionary entries with the same "definition", to take into account handwriting variations.

The metastroke feature correlation matrix (i.e., the data for transformation of all metastrokes into each other), as illustrated in FIG. 13, is used as an integral part of the dynamic programming process, namely, in the path building and the optimal cost calculation. The height correlation matrix is also used in the same processing steps. The optimal cost calculation is a calculation of the following three formulas, followed by a selection of a maximum based on a straight-forward comparison. The maximum among three values is inserted in the cell corresponding to the input metastroke-to-vocabulary metastroke transformation in the word correlation table (e.g., FIG. 8) for each vocabulary word so processed. FIG. 8 is an example built from a dynamic programming process using the data from FIGS. 9-12.

Referring to FIG. 8 for illustration purposes, the calculation is performed by selecting the maximum value ($\alpha$) for the cell at position (a,b) in the word correlation table from among $\alpha$ values calculated for addition, deletion and substitution at those cell positions. The maxima in each instance in FIG. 8 is determined as follows: For substitution:

$$\alpha 1_i{}^j = \alpha_{i-1}{}^{j-1} + p(a_i,b_j) + q(a_i,b_j) \qquad [1]$$

For insertions or additions:

$$\alpha 2_i{}^j = \alpha_{i-1}{}^j + p(a_i) + q(a_i) \qquad [2]$$

For deletions:

$$\alpha 3_i{}^j = \alpha_i{}^{j-1} p(b_j) + q(b_j) \qquad [3]$$

wherein:

$\alpha 1_i{}^j$ is the "cost value"(as used in the vocabulary of dynamic programming), or cumulative score at the cell (i,j) for passing from the origin via cell (i−1, j−1) in substituting the vocabulary metastroke "a" at row position (i) for the input metastroke "b" at column position (j) (FIG. 8);

$p(a_i,b_j)$ is a similarity weighting value (extracted from FIG. 13 or from FIG. 9) of the substitution of an input metastroke "$a_i$" by a vocabulary metastroke "$b_j$";

$q(a_i,b_j)$ is the height weighting value (from the height correlation table, FIG. 14 or FIG. 12) for height substitution occurring in the foregoing substitution of input metastroke "$a_i$" by vocabulary metastroke "$b_j$";

$\alpha 2$ is the "cost value" or cumulative score for passing from the origin via cell (i−1,j) to cell (i,j) in inserting the vocabulary metastroke "a" at row position (i) after the input metastroke "b" at column position (j);

$\alpha 3$ is the "cost value" for cumulative score for passing from the origin via cell (i,j−1) to cell (i,j) in deleting the input metastroke "b" at column (j) along a sequence of metastrokes;

$p(a_i)$ is a penalty value (from FIG. 13, column 0, row i; or from position i of FIG. 10A) for inserting the vocabulary metastroke "a" at row position (i) after the input metastroke "b" at column position (j);

$q(a_i)$ is the penalty value for height associated with the foregoing insertion (FIG. 14 or FIG. 12A);

$p(b_j)$ is a penalty value (from FIG. 13, row 0, column j; or from position j of FIG. 10B) for deleting a metastroke "$b_j$";

$q(b_j)$ is the penalty value for height associated with the foregoing deletion (FIG. 14 or FIG. 12B).

The preferred metastroke string at any cell (i,j) is the maximum cumulative score value alpha ($\alpha$) at cell (i,j) selected from among the first cumulative score value ($\alpha 1$), the second cumulative score value ($\alpha 2$) and the third cumulative score value ($\alpha 3$). This maximum score at any cell is the "optimal cost" at that cell along any path from the origin in the word correlation table of FIG. 8.

A specific example may be helpful. Consider the cell at row i=4, column j=4 in FIG. 8. This cell contains the maximum value among the computed alpha terms $\alpha 1$, $\alpha 2$ or 60 3 for that position.

For computing $\alpha 1$, Equation [1] is applied. The value $\alpha_{i-1}{}^{j-1}$ is 7 from examination of the adjacent diagonal cell FIG. 10. The substitution shown in FIG. 8 for cell (4,4) is from the upward arc (along the top row) to a downward point (along the side column). From FIG. 9, the substitution of the upward arc to a downward arrow, the value $p(a_i,b_j)$ is −1000 indicating a disallowed transition. The corresponding height substitution from the fourth position of FIG. 6B to the fourth position of FIG. 7 is from height 3 to height 5. A transition from height 3 to height 5 has a value of −1000 from FIG. 11. The sum of $\alpha^{j-1}hd\ i-1$, p and q is thus −1993.

For computing $\alpha 2$, Equation [2] is applied for insertion. The value $\alpha_{i-1}{}^j$ is 11, from the adjacent row above cell (4,4) in FIG. 8. The penalty value $p(a_i)$ from FIG. 10A, for insertion of an downward arrow is −2. The corresponding height penalty value $q(a_i)$ for the downward arrow at height 5 (FIG. 7) from FIG. 12A is 0.

Hence the sum $\alpha 2$ and thus a candidate value for cell (4,4) is 9.

For computing $\alpha 3$, Equation [3] is applied for deletion. The value $a_j{}^{-1}$ is 12, from the adjacent column left of cell (4,4) in FIG. 8. The penalty value $p(b_j)$ from FIG. 10B, for deletion of a upward arc is −2. The corresponding height penalty value $q(a_i)$ for the upward arc at height 3 (FIG. 7) from FIG. 12B is 0. Hence the sum $\alpha 3$ and candidate value for cell (4,4) is 10.

Comparing $\alpha 1$, $\alpha 2$ and $\alpha 3$, as through a simple sort, the maximum value is 10. Hence the value 10 is inserted in cell (4,4).

This process is continued for every cell of the word correlation table. For every cell, the maximum $\alpha$ of the substitution, addition and deletion is used. As the word correlation table is computed, the path to each cell from the adjacent cell which resulted in the maximum score is tabulated. At the completion of the process, paths from any cell can be traced back (e.g., from the right boundary or lower boundary) to the origin (0,0). Each such path represents the optimal path between the origin and the selected cell. In the present invention, the right-most and lowest-most cell position from the origin represents the "optimal cost" value for the optimal path through the word correlation matrix for the specific input string tested and terminated with its end mark. The specific input metastroke string is matched to each vocabulary metastroke string from the dictionary (built from the vocabulary of allowable metastroke strings) to obtain numerous word correlation tables. The optimal cost value for the input metastroke string (which value is found at the cell in the last column and last row and which corresponds to the termination of the input metastroke string and vocabulary metastroke string) of each word correlation table is then compared against all corresponding optimal cost values from the other word correlation tables. The maximum of these various optimal cost values is used to identify the vocabulary metastroke string which most closely correlates the input metastroke string with a word ("definition") in the dictionary, assuming minimum recognition criteria have been met. (In other words, a maximum lower than an acceptable minimum is a basis for an indication of a failure to recognize the input string as a word.

The system according to the invention provides a high likelihood of recognizing words produced by the process of cursive handwriting. There is enough redundancy built into this system that even words written in poor handwriting with missing letters and misspellings are given a reasonable likelihood of recognition.

The invention has now been explained with reference to specific embodiments. Other embodiments will be apparent to those of ordinary skill in the art. It is therefore not intended that this invention be limited, except as indicated by the appended claims.

What is claimed is:

1. A method for recognizing cursive handwritten words from the dynamics of the input strokes, said method comprising the steps of:

receiving input signals having values representative of a sequence of points symbolizing handwriting and of a beginning point and of an ending point of said sequence of points;

selecting as a candidate word the sequence of points bounded by said beginning point and said ending point;

replacing said candidate word with a string of input metastrokes in sequential order, each metastroke being representative of an element of a cursive handwritten cipher, to obtain a preliminary metastroke string for each said candidate word;

constructing word correlation tables, by use of a feature correlation table of all metastrokes forming a vocabulary, said feature correlation table relating input metastrokes to vocabulary metastrokes, for selecting strings of vocabulary metastrokes corresponding to said candidate word, said strings of vocabulary metastrokes comprising a listing of entries compiled from variants of known strings of said metastrokes;

extracting a single candidate maximum score for each one of said word correlation tables only upon completion of said word correlation table; and identifying, to an output device, upon completion of said constructing step, based on the highest one of said maximum scores, a most likely match between said candidate word and one of said strings of vocabulary metastrokes.

2. The method according to claim 1, wherein said constructing step comprises dynamic programming said word correlation tables based on stroke order and stroke position relative to a baseline.

3. The method according to claim 1, wherein said constructing step comprises dynamic programming and word correlation tables based on stroke order and stroke position relative to the baselines.

4. A method for recognizing cursive handwritten words from the dynamics of the input strokes, said method comprising the steps of receiving input signals having values representative of a sequence of points symbolizing handwriting and of a beginning point and of an ending point of said sequence of points;

selecting as a candidate word the sequence of points bounded by said beginning point and said ending point;

replacing said candidate word with a string of input metastrokes in sequential order, each metastroke being representative of an element of a cursive handwritten cipher, to obtain a preliminary metastroke string for each said candidate word;

constructing word correlation tables by dynamic programming said word correlation tables based on stroke order and stroke position relative to a baseline using a feature correlation table of all metastrokes forming a vocabulary, said feature correlation table relating input metastrokes to vocabulary metastrokes, for selecting strings of vocabulary metastrokes corresponding to said candidate word, said strings of vocabulary metastrokes comprising a listing of entries compiled from variants of known strings of said metastrokes; wherein said dynamic programming step includes:

determining for each cell in each said word correlation table a first candidate maximum score for substituting a first metastroke for a second metastroke, using substitution weighting from said feature correlation table;

determining for each cell in each said word correlation table a second candidate maximum score for inserting a metastroke from the string of vocabulary metastrokes into said candidate word, using addition penalty weighting from said feature correlation table;

determining for each cell in each said word correlation table a third candidate maximum score for deleting a metastroke from said candidate word to obtain a possible match to the string of vocabulary metastrokes, using penalty weighting from said feature correlation table; and placing in each cell the maximum one from among the first maximum candidate score, the second maximum candidate score and the third maximum candidate score; thereafter extracting a single candidate maximum score for each one of said word correlation tables only upon completion of said word correlation table; and identifying, to an output device, upon completion of said constructing step, based on the highest one of said maximum scores, a most likely match between said candidate word and one of said strings of vocabulary metastrokes.

5. A method for recognizing cursive handwritten words from the dynamics of the input strokes, said method comprising the steps of:

receiving input signals having values representative of a sequence of points symbolizing handwriting and of a beginning point and of an ending point of said sequence of points;

selecting as a candidate word the sequence of points bounded by said beginning point and said ending point;

locating and tabulating, in sequential order, critical points in said candidate word, said critical points including maxima, minima, intersections, dots and crossovers;

replacing said candidate word with a string of metastrokes in sequential order, each metastroke being representative of an element of a cursive handwritten cipher, said replacing step comprising comparing said critical points against indicia of known critical points of a selection of said metastrokes to obtain a preliminary metastroke string for each said candidate word;

constructing word correlation tables, by use of a feature correlation table of all metastrokes forming a vocabulary, said feature correlation table relating input metastrokes to vocabulary metastrokes, for selecting strings of vocabulary metastrokes corresponding to said candidate word, said strings of vocabulary metastrokes comprising a listing of entries compiled from variants of known strings of said metastrokes;

choosing preferred metastroke strings according to an optimal cost calculation, said optimal cost calculation comprising the weighting of additions, deletions, and substitutions of metastrokes relative to adjacent metastrokes;

extracting a single candidate maximum score for each one of said word correlation tables only upon completion of said word correlation table; and identifying, to an output device, candidate words from a listing of said most likely matches from said dictionary, with an indication of positive recognition of a single candidate word upon achievement of a likelihood of match in excess of a preselected threshold value.

6. The method according to claim 5, further including the step of:

establishing a bottom baseline and a top baseline for said candidate word to determine height and scale.

7. The method according to claim 6, wherein said establishing step comprises the steps of:

measuring average slant of selected sequences of points of said candidate word; and dividing said candidate word into a middle zone between said lower baseline and said upper baseline, where bodies of letters are predicted to reside, into an upper zone wherein ascenders of letters are predicted to reside, and into a lower zone wherein descenders of letters are predicted to reside.

8. The method according to claim 5 wherein said said constructing uses i) a forward sequence of said metastrokes, ii) a reverse sequence of said metastrokes, and iii) most likely beginnings of words and on most likely endings of words.

9. The method according to claim 5 wherein said maximum score extraction comprises the steps of:

determining for each cell in each said word correlation table a first candidate maximum score for substituting a first metastroke for a second metastroke, using substitution weighting from said feature correlation table;

determining for each cell in each said word correlation table a second candidate maximum score for inserting a metastroke from the string of vocabulary metastrokes into said candidate word, using addition penalty weighting from said feature correlation table;

determining for each cell in each said word correlation table a third candidate maximum score for deleting a metastroke from said candidate word to obtain a possible match to the string of vocabulary metastrokes, using penalty weighting from said feature correlation table; and placing in each cell the maximum one from among the first maximum candidate score, the second maximum candidate score and the third maximum candidate score.

10. A method for recognizing cursive handwritten words from the dynamics of the input strokes, said method comprising the steps of:

receiving input signals having values representative of a sequence of points symbolizing handwriting and of a beginning point and of an ending point of said sequence of points, said sequence of points being defined within a coordinate system;

selecting as a candidate word the sequence of points bounded by said beginning point and said ending point;

reconstructing said candidate word as a reconstructed word with a substitute sequence of points, said substitute sequence of points having interpolated points inserted and spurious points deleted;

establishing a bottom baseline and a top baseline for said candidate word to determine height and scale;

locating and tabulating, in sequential order, critical points in said reconstructed word, said critical points including maxima, minima, intersections, dots and crossovers;

replacing said reconstructed word with a string of metastrokes in sequential order, each metastroke being representative of an element of a handwritten cipher, said replacing step comprising comparing said critical points against indicia of known critical points of a minimum of twenty of said metastrokes to obtain a preliminary metastroke string for each said reconstructed word;

constructing word correlation tables, by use of a feature correlation table of all metastrokes forming a vocabulary, said feature correlation table relating input metastrokes to vocabulary metastrokes, for selecting strings of vocabulary metastrokes corresponding to said candidate word, said strings of vocabulary metastrokes comprising a listing of entries compiled from variants of known strings of said metastrokes;

choosing preferred metastroke strings according to an optimal cost calculation, said optimal cost calculation comprising the weighting of additions, deletions, and substitutions of metastrokes relative to adjacent metastrokes;

extracting a single candidate maximum score for each one of said word correlation tables only upon completion of said word correlation table; and identifying, to an output device, based on the highest one of said maximum scores, a most likely match between said candidate word and one of said strings of vocabulary metastrokes upon achievement of a maximum score in excess of a preselected threshold value.

11. The method according to claim 10, wherein said establishing step comprises measuring average slant of sequences of points of said candidate word and dividing said candidate word into a middle zone between said lower baseline and said upper baseline, where bodies of letters are predicted to reside, into an upper zone wherein ascenders of letters are predicted to reside, and into a lower zone wherein descenders of letters are predicted to reside.

12. The method according to claim 10 wherein said feature correlation table includes positive weighting for substitutions and penalty weighting for additions and deletions.

13. A method for recognizing cursive handwritten words from the dynamics of the input strokes, said method comprising the steps of:

receiving input signals having values representative of a sequence of points symbolizing handwriting and of a beginning point and of an ending point of said sequence of points;

selecting as a candidate word the sequence of points bounded by said beginning point and said ending point;

locating and tabulating, in sequential order, critical points in said candidate word, said critical points including maxima, minima, intersections, dots and crossovers;

replacing said candidate word with a string of metastrokes in sequential order, each metastroke being representative of an element of a cursive handwritten cipher, said replacing step comprising comparing said critical points against indicia of known critical points of a selection of said metastrokes to obtain a preliminary metastroke string for each said candidate word;

constructing word correlation tables, by use of a feature correlation table of all metastrokes forming a vocabulary, said feature correlation table relating input metastrokes to vocabulary metastrokes, for selecting strings of vocabulary metastrokes corresponding to said candidate word, said strings of vocabulary metastrokes comprising a listing of entries compiled from variants of known strings of said metastrokes;

choosing preferred metastroke strings according to an optimal cost calculation, said optimal cost calculation comprising the weighting of additions, deletions, and substitutions of metastrokes relative to adjacent metastrokes;

extracting a single candidate maximum score for each one of said word correlation tables only upon completion of said word correlation table; and identifying, to an output device, candidate words from a listing of said most likely matches from said dictionary, with an indication of positive recognition of a single candidate word upon achievement of a likelihood of match in excess of a preselected threshold value;

wherein said optimal cost calculation comprises the steps of:

determining a first candidate maximum score value of an exchange of a first candidate metastroke with a second candidate metastroke at a cell in the word correlation table employing data from the feature correlation table and a height correlation table according to the relation:

$$\alpha 1_i^j = \alpha_{i-1}^{j-1} + p(a_i, b_j) + q(a_i, b_j) \qquad [1]$$

determining a second candidate maximum score value of an addition of a second candidate metastroke at a cell in the word correlation table according to the relation:

$$\alpha 2_i^j = \alpha_{i-1}^j + p(a_i) + q(a_i) \qquad [2]$$

and determining a third candidate maximum score value of a deletion of said first candidate metastroke at a cell in the word correlation table according to the relation:

$$\alpha 3_i^j = \alpha_i^{j-1} p(b_j) + q(b_j) \qquad [3]$$

wherein:

$\alpha_i^j$ is the "cost value" (as used in the vocabulary of dynamic programming), or cumulative score at the cell (i,j) for passing from the origin via cell (i−1, j−1) in substituting the vocabulary metastroke "a" at row position (i) for the input metastroke "b" at column position (j);

$p(a_i, b_j)$ is a similarity weighting value of the substitution of an input metastroke "$a_1$" by a vocabulary metastroke "$b_j$";

$q(a_i, b_j)$ is the height weighting value for height substitution occurring in the foregoing substitution of input metastroke "$a_i$" by vocabulary metastroke "$b_j$";

$\alpha 2$ is the "cost value" or cumulative score for passing from the origin via cell (i−1,j) to cell (i,j) in inserting the vocabulary metastroke "a" at row position (i) after the input metastroke "b" at column position (j);

$\alpha 3$ is the "cost value" for cumulative score for passing from the origin via cell (i,j−1) to cell (i,j) in deleting the input metastroke "b" at column (j) along a sequence of metastrokes;

$p(a_i)$ is a penalty value for inserting the vocabulary metastroke "a" at row position (i) after the input metastroke "b" at column position (j);

$q(i)$ is the penalty value for height associated with the foregoing insertion;

p(b$_j$) is a penalty value for deleting a metastroke "b$_j$";
q(b$_j$) is the penalty value for height associated with the foregoing deletion.

14. An apparatus for recognizing cursive handwritten words from the dynamics of the input strokes, said apparatus comprising:

means for receiving input signals having values representative of a sequence of points symbolizing handwriting and of a beginning point and of an ending point of said sequence of points;

means coupled to said receiving means for selecting as a candidate word a sequence of points bounded by said beginning point and said ending point;

means coupled to said combining means for locating and tabulating, in sequential order, critical points in said candidate word, said critical points including maxima, minima, intersections, dots and crossovers;

means coupled to said locating and tabulating means for replacing said candidate word with a sequence of metastrokes in sequential order, each metastroke being representative of an element of a cursive handwritten cipher, said replacing means comprising means for comparing said critical points against indicia of known critical points to obtain a preliminary metastroke sequence for each said candidate word;

means for constructing word correlation tables, by use of a feature correlation table of all metastrokes forming a vocabulary, said feature correlation table relating input metastrokes to vocabulary metastrokes, for selecting strings of vocabulary metastrokes corresponding to said candidate word, said strings of vocabulary metastrokes comprising a listing of entries compiled from variants of known strings of said metastrokes;

means for choosing preferred metastroke strings according to an optimal cost calculation, said choosing means comprising means for the weighting of additions, deletions, and substitutions of metastrokes relative to adjacent metastrokes;

means for extracting a single candidate maximum score for each one of said word correlation tables only upon completion of said word correlation table; and means for identifying, to an output device, candidate words from a listing of said most likely matches from said dictionary, with an indication of positive recognition of a single candidate word upon achievement of a likelihood of match in excess of a preselected threshold value.

15. The apparatus according to claim 14, further including:

means for establishing a bottom baseline and a top baseline for said candidate word to determine height and scale.

16. The apparatus according to claim 15, wherein said establishing means comprises:

means for dividing said candidate word into a middle zone between said lower baseline and said upper baseline, where bodies of letters are predicted to reside, into an upper zone wherein ascenders of letters are predicted to reside, and into a lower zone wherein descenders of letters are predicted to reside; and means for measuring average slant of selected sequences of points of said candidate word.

17. The apparatus according to claim 15 wherein said metastroke replacing means comprises means for making a likelihood of match measurement, said likelihood of match measurement based on comparison between said critical points and said indicia of known critical points, and on height of a metastroke relative to said bottom baseline and said top baseline.

18. The apparatus according to claim 14 wherein said maximum score calculation means comprises, at selected positions in said sequence of metastrokes:

means for determining for each cell in each said word correlation table a first candidate maximum score for substituting a first metastroke for a second metastroke, using substitution weighting from said feature correlation table;

means for determining for each cell in each said word correlation table a second candidate maximum score for inserting a metastroke from the string of vocabulary metastrokes into said candidate word, using addition penalty weighting from said feature correlation table;

means for determining for each cell in each said word correlation table a third candidate maximum score for deleting a metastroke from said candidate word to obtain a possible match to the string of vocabulary metastrokes, using penalty weighting from said feature correlation table; and means for placing in each cell the maximum one from among the first maximum candidate score, the second maximum candidate score and the third maximum candidate score.

19. The apparatus according to claim 14, wherein said constructing means processes on i) a forward sequence of said metastrokes, on ii) a reverse sequence of said metastrokes, on iii) most likely beginnings of words and on iv) most likely endings of words.

20. The apparatus according to claim 14, wherein said choosing means comprises:

means for determining a first candidate maximum score value of an exchange of a first candidate metastroke with a second candidate metastroke at a cell in the word correlation table employing data from the feature correlation table and a height correlation table according to the relation:

$$\alpha 1_i{}^j = a_{i-1}{}^{j-1} + p(a_i,b_j) + q(a_j,b_j) \quad [1]$$

means for determining a second candidate maximum score value of an addition of a second candidate metastroke at a cell in the word correlation table according to the relation:

$$\alpha 2_i{}^j = a_{i-1}{}^j + p(a_i) + q(a_i) \quad [2]$$

and means for determining a third candidate maximum score value of a deletion of said first candidate metastroke at a cell in the word correlation table according to the relation:

$$\alpha 3_i{}^j = a_i{}^{j-1} p(b_j) + q(b_j) \quad [3]$$

wherein:

$\alpha 1_i{}^j$ is the "cost value" (as used in the Vocabulary of dynamic programming), or cumulative score at the cell (i,j) for passing from the origin via cell (i−1,j−1) in substituting the vocabulary metastroke "a" at row position (i) for the input metastroke "b" at column position (j);

$p(a_i, b_j)$ is a similarity weighting value of the substitution of an input metastroke "$a_i$" by a vocabulary metastroke "$b_j$";

$q(a_i, b_j)$ is the height weighting value for height substitution occurring in the foregoing substitution of input metastroke "$a_i$" by vocabulary metastroke "$b_j$";

α2 is the "cost value" or cumulative score for passing from the origin via cell (i−1,j) to cell (i,j) in inserting the vocabulary metastroke "a" at row position (i) after the input metastroke "b" at column position (j);

α3 is the "cost value" for cumulative score for passing from the origin via cell (i,j−1) to cell (i,j) in deleting the input metastroke "b" at column (j) along a sequence of metastrokes;

$p(a_i)$ is a penalty value for inserting the vocabulary metastroke "a" at row position (i) after the input metastroke "b" at column position (j);

$q(a_i)$ is the penalty value for height associated with the foregoing insertion;

$p(b_j)$ is a penalty value for deleting a metastroke "$b_j$";

$q(b_j)$ is the penalty value for height associated with the foregoing deletion.

* * * * *